Feb. 2, 1926.
H. C. LOCKWOOD
EGG BEATER
Filed July 24, 1925
1,571,591
2 Sheets-Sheet 1
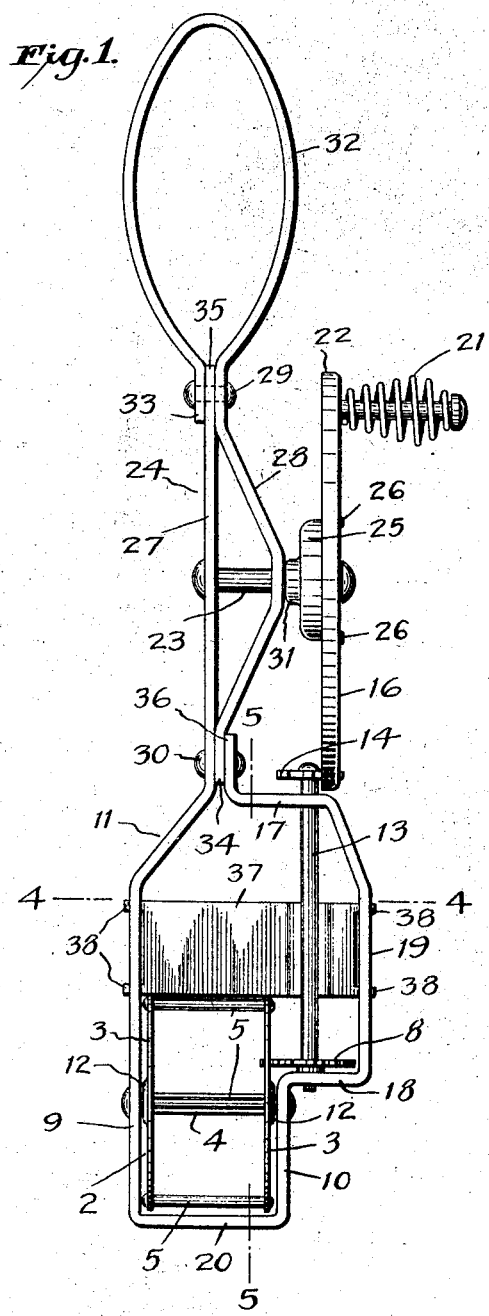
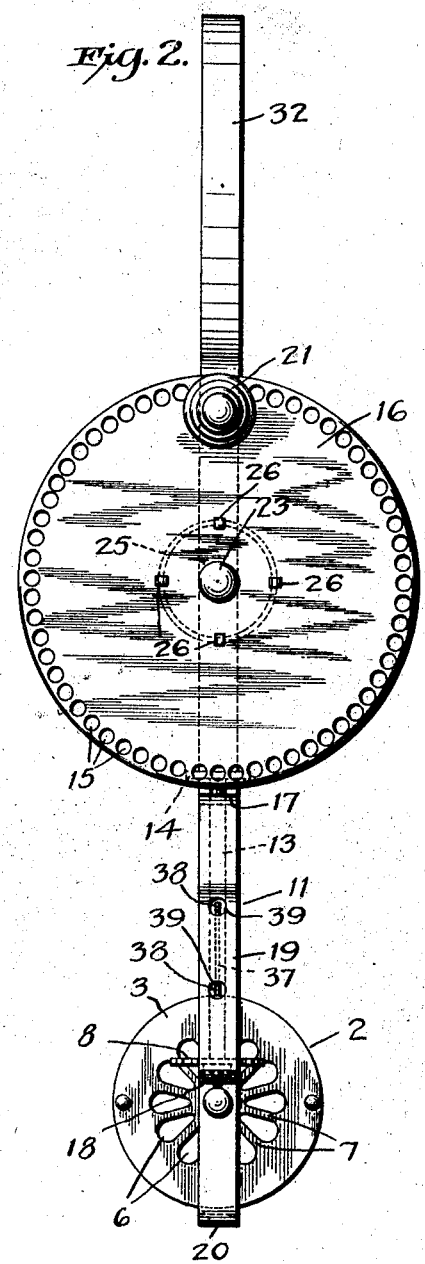
INVENTOR
Harry C. Lockwood
BY
Clarence G. Galston
ATTORNEY Feb. 2, 1926.  
H. C. LOCKWOOD  
EGG BEATER  
Filed July 24, 1925  
1,571,591  
2 Sheets-Sheet 2
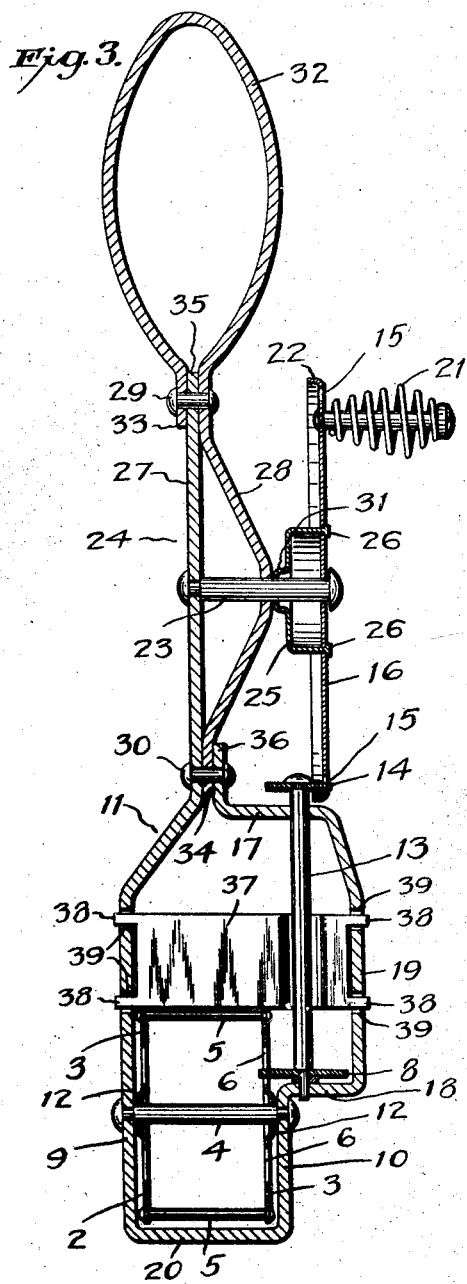
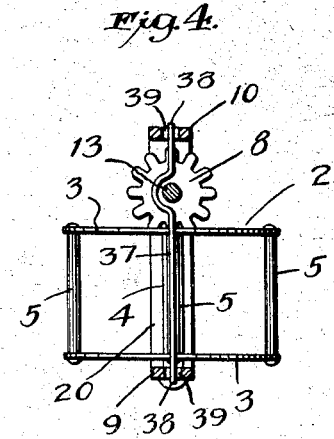
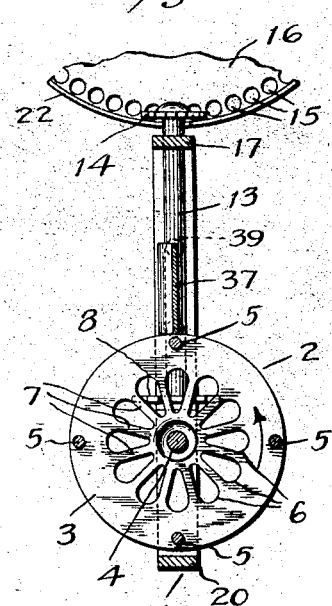
INVENTOR  
Harry C. Lockwood  
BY  
Clarence G. Galston  
ATTORNEY Patented Feb. 2, 1926.

1,571,591

UNITED STATES PATENT OFFICE.

HARRY C. LOCKWOOD, OF BROOKLYN, NEW YORK.

EGG BEATER.

Application filed July 24, 1925. Serial No. 45,737.

*To all whom it may concern:*

Be it known that I, HARRY C. LOCKWOOD, a citizen of the United States, residing at 145 Hawthorne Street, Brooklyn, N. Y., in the county of Kings and State of New York, have invented a new and useful Egg Beater, of which the following is a specification.

The object of my invention is to provide a household, egg-beating hand implement which has a powerful beating action; which mixes ingredients completely, even dissolving flour particles in egg and milk; and which effects the greatest possible aeration; and further, to accomplish these results with small effort and little time. By aeration is meant the entrainment and intimate admixture of air with the viscous or liquid material, which is highly important in turning out a fine, smooth product of large volume. Another object of the invention is to provide an egg-beater which is compact enough to fit into a cup, when it is desired to beat, for example, the white of a single egg, and yet which is more powerful and effective than the large or full-size egg-beaters now on the market. The demand for a cup-size egg-beater is indicated by the fact that several manufacturers are now turning out a cup-size in addition to their standard size. Further objects of my invention are practically to eliminate splashing, to increase accessibility and ease of cleaning, to employ constructions which permit a high gear ratio, which makes slow and easy turning possible, and to achieve simplicity in construction and manufacture. To these ends the invention may be said to consist in the novel type and construction of egg-beater, of novel and improved operation, which will now be described with reference to a preferred embodiment, and the novel parts and combinations of which will be hereinafter more particularly pointed out in the claims.

In the accompanying drawings forming a part hereof:

Fig. 1 is a front elevation;
Fig. 2 is a side elevation;
Fig. 3 is a vertical section, taken in the central plane of the axes;
Fig. 4 is a horizontal section on the line 4—4 of Fig. 1; and Fig. 5 is a vertical section on the line 5—5 of Fig. 1.

The beating and aerating member 2, which may be termed the beater rotor, consists of two circular disks or plates 3 concentric with and at right angles to a horizontal shaft or axle 4, with intervening horizontal rods 5 secured at their opposite ends in the outer portions of the disks and connecting the same. These rods are preferably comparatively widely spaced, as illustrated in the drawings, wherein four rods are shown equally spaced on or near the peripheral portions of the disks. The precise arrangement may, however, be varied.

The disks are perforated at 6 to form integral driving teeth or webs 7, with ample metal removed to give generous clearance for the teeth of the driving pinion 8. Both disks are so perforated, because it costs less to manufacture them identical, and also because of the decorative effect. The disks 3 are centrally apertured to turn freely upon the axle 4, the ends of which are secured in the opposite sides 9 and 10 of the lower portion of a strip frame 11. This lower portion of the frame is preferably of rectangular U-shape, closely approaching the rotor at the bottom and also preferably at the sides, the disks 3 being formed with central bosses 12, which space the disks somewhat from the sides of the frame and reduce friction.

The beater rotor is driven by the horizontal pinion 8, which is fixed to the lower end of a vertical rotary driving shaft 13. A second horizontal pinion 14, fixed to the upper end of the shaft 13, is driven by engagement with the metal webs between holes 15 formed in the outer portion of a large-diameter hand-drive-wheel disk 16. The vertical shaft 13 thus serves as an intermediate rotary driving member between the hand-drive-wheel and the beater rotor.

The shaft 13 turns in holes in the upper and lower transverse portions 17 and 18 of a lateral offset or extension 19 formed by bending the material of the strip frame. The pinion 8 lies above the frame portion 18 and within the offset, while the pinion 14 lies above the frame portion 17 and outside the offset. The construction affords a very simple, compact and effective beater and drive. The transverse compactness and the nature of the operation of the beater are such that the device can be used in an ordinary cup. The transverse bottom or foot 20 of the frame guards the bottom of the rotor and affords a more stable rest than is found in ordinary egg-beaters.

The hand-drive-wheel 16 has a suitable crank handle 21, and is formed with a rearwardly turned, peripheral flange 22 outside the perforations 15, which permits the large disk to be made of light sheet metal without flexing so as to lose driving engagement with the pinion 14.

The disk 16 has a central aperture turning freely on an overhung shaft or axle 23 cantilevered out from the shank or intermediate portion of the strip frame 11. A cup 25, formed separately from the driving disk and having its flange riveted to the inner portion of the disk at points 26 around the axis, affords a second, spaced point of turning bearing on the shaft, the back of this cup being centrally apertured in line with the aperture in the disk. The disk and its cup or hub turn on the shaft, and are not fixed thereto; and the multiple, spaced points of bearing insure that the driving wheel will not wabble on its shaft so as to skip engagement with the pinion, a defect frequently present in egg-beaters. Furthermore, the shaft on which the wheel turns is given a well-spaced, two-point, rigid support on the frame. To this end, the shank portion 24 of the frame is shown composed of two strips 27 and 28, the strip 27 being preferably straight and having the rear end of the shaft 23 riveted to it, while the strip 28 is bent outwardly away from the strip 27, so that at the middle there is a considerable distance between them. At this point the strip 28 is perforated in line with the perforation of the strip 27 wherein the end of the shaft is riveted, the shaft, therefore, being strongly braced in the strip 28, which inclines rearward in both directions from the shaft and is united to the strip 27, above and below, by the rivets 29 and 30. The construction affords a very rigid and easy running drive. A central boss 31 on the back of the cup strengthens the construction and reduces friction between the wheel and the frame.

At the top, the strip frame is looped to form a suitable handle 32. The frame is shown advantageously made of two strips of metal. One end 33 of one of these strips is seen at the base of the handle. From this point the strip is curved outward and upward and then downward and outward, forming the handle, and continues downward from the base of the handle to form the member 28 of the shank, the lower end 34 of this strip being caught at the rivet joint 30 between the shank and lower portions of the frame. The upper end 35 of the other strip is caught in the rivet joint 29 at the junction between the shank and handle portions; and this strip thence extends downward, forming the member 27 of the shank. Continuing below the rivet joint 30, it is bent around to form the lower portion of the frame, with the lateral offset containing the shaft 13; and its other end 36 is secured by the rivet 30. The specific design of the frame may, however, be varied.

A deflector or impact plate 37 stands across the upper side of the beater rotor 2, so as to intercept the material carried by the upgoing side of the beater. This plate is advantageously mounted in the frame in such manner as to float on top of the disks of the rotor, this being conveniently accomplished by providing the ends of the plate with lugs 38 which lie in oversize holes 39 in the opposite sides of the frame. The impact plate is preferably substantially flat and preferably lies in an approximately vertical plane, but the details may be varied.

In operation, the bars 5 revolving about the horizontal axis 4 beat or slap the liquid in a plane parallel to its normal surface, i. e. horizontally, at the instant of impact. This horizontal slap is a direct blow against the most solid resistance that it is possible for the liquid to offer, and the result is a very powerful and rapid action in beating eggs or the like. The mass of the depth of the liquid opposes the blow. This slapping breaks up the liquid and simultaneously whips in air. The rapidly rotating beater rotor depresses the liquid on the down side, and piles it up on the up side, carrying a stream up to the top and impinging it against the impact plate. All of these actions have a beating and aerating effect, and also produce a rapid circulation.

The end disks 2, 3 of the beater rotor not only serve to support the horizontal rods 5, but also have important effects in the beating action. The adhesion of the liquid to the large surfaces of the two disks, together with the surface tension of the liquid, holds the liquid on the beater rotor at the highest speeds and prevents it being thrown off on the up side. This action is so strong that, with a viscous liquid like cream or eggs, the revolving liquid is decidedly concave toward the beater rotor. The large surfaces of the disks also assist aeration, since the thin film of liquid presented by them is very susceptible to aeration.

The constructions which I employ lend themselves readily to a high driving ratio, which means a high beating speed with slow hand turning; and the construction is further such as to enable the greater part of the egg-beater to be made from sheet metal by very economical manufacturing methods.

What is claimed as new is:

1. A household egg-beater implement comprising a frame formed with an upper handle portion, an intermediate shank portion and a lower rectangular U-portion adapted to fit in a cup or vessel, a beater rotatably mounted on a transverse axis between the sides of said U-portion and guarded by the transverse bottom rest member of said portion, a hand-wheel mounted on a substantially horizontal axis on the intermediate portion of the frame, and an intermediate substantially vertical rotary shaft member mounted in the lower part of the frame above and at one side of said U-portion and having driving engagement at its opposite ends with said hand-wheel and said beater.

2. A household egg-beater implement comprising a frame formed with an upper handle portion, an intermediate shank portion and a lower rectangular U-portion adapted to fit in a cup or vessel, a beater rotatably mounted on a transverse axis between the side of said U-portion and guarded by the transverse bottom rest member of said portion, said beater comprising transverse beating rods, a hand-wheel mounted on a substantially horizontal axis on the intermediate portion of the frame, and an intermediate substantially vertical rotary shaft member mounted in said frame at one side of said U-portion carrying upper and lower toothed wheels in driving connection, respectively, with said hand-wheel and said beater.

3. A household egg-beater implement comprising a frame formed with an upper handle portion, an intermediate shank portion and a lower rectangular U-portion adapted to fit in a cup or vessel, a beater rotatably mounted on a transverse axis between the sides of said U-portion and guarded by the transverse bottom rest member of said portion, said beater comprising a pair of plates disposed substantially at right angles to the axis of rotation, with beating rods placed between and connected to said plates, a hand-wheel mounted on a substantially horizontal axis on the intermediate portion of the frame, and an intermediate substantially vertical rotary shaft member mounted in said frame at one side of said U-portion carrying upper and lower toothed wheels in driving connection, respectively, with said hand-wheel and said beater.

4. A household egg-beater implement comprising a frame formed with an upper handle portion, an intermediate shank portion and a lower rectangular U-portion adapted to fit in a cup or vessel, a beater rotatably mounted on a transverse axis between the sides of said U-portion and guarded by the transverse bottom rest member of said portion, said beater comprising transverse beating rods, a hand-wheel mounted on a substantially horizontal axis on the intermediate portion of the frame, and an intermediate substantially vertical rotary shaft member mounted in the lower part of the frame above and at one side of said U-portion and having driving engagement at its opposite ends with said hand-wheel and said beater.

5. A household egg-beater implement comprising a frame formed with an upper handle portion, an intermediate shank portion and a lower rectangular U-portion adapted to fit in a cup or vessel, a beater rotatably mounted on a transverse axis between the sides of said U-portion and guarded by the transverse bottom rest member of said portion, said beater comprising a pair of plates disposed substantially at right angles to the axis of rotation, with beating rods placed between and connected to said plates, a hand-wheel mounted on a substantially horizontal axis on the intermediate portion of the frame, and an intermediate substantially vertical rotary shaft member mounted in the lower part of the frame above and at one side of said U-portion and having driving engagement at its opposite ends with said hand-wheel and said beater.

6. A household egg-beater implement comprising a frame formed with an upper handle portion, an intermediate shank portion, and a lower rectangular U-portion adapted to fit in a cup or vessel, the frame being also formed with a lateral offset overhanging one of the side members of the U-portion, a beater rotatably mounted on a transverse axis between the side members of said U-portion and guarded by the transverse bottom rest member of said portion, a hand-wheel mounted on a substantially horizontal axis on the intermediate portion of the frame, and an intermediate substantially vertical rotary shaft member mounted in said lateral offset and having driving connection at its opposite ends with said hand-wheel and said beater.

7. A household egg-beater implement, comprising a frame formed with an upper handle portion, an intermediate shank portion and a lower rectangular U-portion adapted to fit in a cup or vessel, a beater rotatably mounted on a transverse axis between the sides of said U-portion and guarded by the transverse bottom rest member of said portion, said beater having a plate placed substantially at right angles to the axis of rotation, a large diameter hand-wheel disc mounted on a substantially horizontal axis on the intermediate portion of said frame, and an intermediate substantially vertical shaft member mounted in the frame with upper and lower toothed wheels to engage directly with said disc and plate.

8. A household egg-beater element comprising a frame having a handle at its upper end, a rectangular U-portion at its lower end, and a lateral offset overhanging one of the side members of said U-portion, a beater rotatably mounted on a substantially horizontal axis between the side members of said U-portion, a hand drive wheel on a substantially horizontal axis on an intermediate part of the frame, an intermediate substantially vertical rotary shaft journaled in said offset, a toothed wheel on the lower part of said shaft inside said offset in driving relation to said beater, and another toothed wheel on the upper part of said intermediate shaft outside the offset for driving connection with said hand-wheel.

9. In an egg-beater, a beater rotor comprising plates disposed substantially at right angles to the axis of rotation, with beating members placed between and connected to said plates, one or both of said plates being formed integrally within itself with means for engagement by a driving pinion.

10. A household egg-beater implement comprising a frame having a handle at the upper end and a rectangular U lower portion, a beater rotor rotating on a substantially horizontal axis in the lower part of said frame, said frame having a lateral offset above its bottom, and a vertical rotary member driving said beater rotor mounted in said lateral offset.

11. An egg-beater having a frame, a beater and an overhung rotary driving member from which the beater is driven, said frame being formed above the beater with spaced supporting members, and a horizontal overhung, cantilevered shaft having rigid, separated, two-point support in said members and affording at its outer portion a journal bearing on which said driving member is free to turn.

12. An egg-beater having a frame, a beater, said frame being provided above the beater with spaced supporting members, a horizontal, overhung, cantilevered shaft having rigid, separated, two-point support in said members, and an overhung hand wheel from which the beater is driven, said hand wheel being free to turn on the outer portion of the shaft and comprising a centrally apertured disk, and a centrally apertured cup fixed to the central portion of the disk, forming two separated points of rotating bearing on the projecting portion of said shaft.

13. An egg-beater, having a strip frame having a shank portion comprising two strip members brought together at upper and lower points and spaced apart between said points, an overhung, cantilevered shaft having rigid, separated, two-point support in the intermediate portions of said shank members, and an overhung rotary driving member free to turn on the outer portion of said shaft.

14. An egg-beater, comprising a frame, a beater rotor rotating on a substantially horizontal axis in the lower portion of the frame, and an impact member immediately above the beater rotor.

15. An egg-beater, comprising a frame, a beater rotor rotating on a substantially horizontal axis in the lower portion of the frame, and an impact member floating on top of the beater rotor.

16. An egg-beater, comprising a frame, a beater rotor rotating on a substantially horizontal axis in the lower portion of the frame, and an impact plate standing on edge across the top of the beater rotor.

17. An egg-beater having a beater rotor mounted on a substantially horizontal axis, and an impact member adjacent said beater rotor, against which the material carried upward is impinged.

HARRY C. LOCKWOOD.